(12) United States Patent
Rust et al.

(10) Patent No.: US 8,606,403 B2
(45) Date of Patent: Dec. 10, 2013

(54) HAPTIC INTERFACE HANDLE WITH FORCE-INDICATING TRIGGER MECHANISM

(75) Inventors: John B. Rust, Palm Bay, FL (US); Matthew D. Summer, Melbourne, FL (US); Paul M. Bosscher, West Melbourne, FL (US); William S. Bowman, Melbourne, FL (US); Loran J. Wilkinson, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 345 days.

(21) Appl. No.: 12/967,267

(22) Filed: Dec. 14, 2010

(65) Prior Publication Data

US 2012/0150349 A1 Jun. 14, 2012

(51) Int. Cl.
*G05B 19/04* (2006.01)
*G05B 19/18* (2006.01)
*G05B 15/00* (2006.01)
*G05B 19/00* (2006.01)

(52) U.S. Cl.
USPC ............ 700/258; 700/257; 700/260; 901/11; 901/33; 901/34

(58) Field of Classification Search
None
See application file for complete search history.

(56) References Cited

U.S. PATENT DOCUMENTS

| | | | |
|---|---|---|---|
| 3,280,991 A | 10/1966 | Melton | |
| 3,637,092 A * | 1/1972 | George et al. | 414/5 |
| 4,216,467 A | 8/1980 | Colston | |
| 4,762,006 A | 8/1988 | Asakawa et al. | |
| 4,791,588 A | 12/1988 | Onda et al. | |
| 4,795,296 A * | 1/1989 | Jau | 414/5 |
| 4,837,734 A | 6/1989 | Ichikawa et al. | |
| 4,842,308 A | 6/1989 | Spotts | |
| 4,853,874 A | 8/1989 | Iwamoto et al. | |
| 4,860,215 A | 8/1989 | Seraji | |
| 4,862,751 A | 9/1989 | Asakawa et al. | |

(Continued)

FOREIGN PATENT DOCUMENTS

| EP | 0672507 A1 | 9/1995 |
|---|---|---|
| EP | 1 876 505 A1 | 1/2008 |

(Continued)

OTHER PUBLICATIONS

Zarrad, W., et al., "Stability and Transparency Analysis of a Haptic Feedback Controller for Medical Applications", Proceedings of the 46th IEEE Conference on Decision and Control : New Orleans, LA, Dec. 12-14, 2007, IEEE, Piscataway, NJ, USA, Dec. 1, 2007, pp. 5767-5772.

(Continued)

*Primary Examiner* — Khoi Tran
*Assistant Examiner* — Bao Long T Nguyen
(74) *Attorney, Agent, or Firm* — Fox Rothschild, LLP; Robert J. Sacco

(57) ABSTRACT

Method and system for telematic control of a slave device (402) includes a hand control (101) type control interface which includes a hand grip (102) having an elongated body (202). One or more sensors (208) are provided for sensing a physical displacement of a trigger (212) disposed on the hand grip. An actuator or motor (206) is disposed in the hand grip that is responsive to a control signal from a control system (401) for dynamically controlling a force applied by the trigger to a user of the hand control interface.

25 Claims, 8 Drawing Sheets

(56) References Cited

U.S. PATENT DOCUMENTS

| | | | |
|---|---|---|---|
| 4,893,981 | A | 1/1990 | Yoshinada et al. |
| 5,004,391 | A | 4/1991 | Burdea |
| 5,007,300 | A | 4/1991 | Siva |
| 5,018,922 | A * | 5/1991 | Yoshinada et al. ............... 414/5 |
| 5,092,645 | A | 3/1992 | Okada |
| 5,231,693 | A | 7/1993 | Backes et al. |
| 5,382,885 | A | 1/1995 | Salcudean et al. |
| 5,565,891 | A | 10/1996 | Armstrong |
| 5,589,828 | A | 12/1996 | Armstrong |
| 5,694,013 | A | 12/1997 | Stewart et al. |
| 5,737,500 | A | 4/1998 | Seraji et al. |
| 5,792,165 | A * | 8/1998 | Klieman et al. ............. 606/170 |
| 5,831,408 | A | 11/1998 | Jacobus et al. |
| 6,047,610 | A | 4/2000 | Stocco et al. |
| 6,088,017 | A | 7/2000 | Tremblay et al. |
| 6,104,158 | A | 8/2000 | Jacobus et al. |
| 6,184,868 | B1 | 2/2001 | Shahoian et al. |
| 6,246,390 | B1 | 6/2001 | Rosenberg |
| 6,281,651 | B1 | 8/2001 | Haanpaa et al. |
| 6,522,952 | B1 | 2/2003 | Arai et al. |
| 6,535,793 | B2 | 3/2003 | Allard |
| 6,636,161 | B2 | 10/2003 | Rosenberg |
| 6,705,871 | B1 | 3/2004 | Bevirt et al. |
| 6,781,569 | B1 | 8/2004 | Gregorio et al. |
| 6,793,653 | B2 * | 9/2004 | Sanchez et al. ................... 606/1 |
| 6,801,008 | B1 * | 10/2004 | Jacobus et al. ........... 318/568.11 |
| 7,138,981 | B2 | 11/2006 | Kim et al. |
| 7,168,748 | B2 | 1/2007 | Townsend et al. |
| 7,345,672 | B2 | 3/2008 | Jacobus et al. |
| 7,480,600 | B2 | 1/2009 | Massie et al. |
| 7,783,384 | B2 * | 8/2010 | Kraft ............................ 700/245 |
| 8,226,072 | B2 * | 7/2012 | Murayama ...................... 269/55 |
| 2001/0002098 | A1 | 5/2001 | Haanpaa et al. |
| 2003/0169235 | A1 | 9/2003 | Gron et al. |
| 2005/0252329 | A1 | 11/2005 | Demers |
| 2006/0066574 | A1 | 3/2006 | Kim et al. |
| 2007/0050139 | A1 | 3/2007 | Sidman |
| 2008/0063400 | A1 | 3/2008 | Hudson et al. |
| 2009/0182436 | A1 | 7/2009 | Ferrara |
| 2010/0019890 | A1 | 1/2010 | Helmer et al. |
| 2010/0041991 | A1 | 2/2010 | Roundhill |
| 2010/0070079 | A1 | 3/2010 | Mangaser et al. |
| 2010/0092267 | A1 | 4/2010 | Najdovski et al. |
| 2010/0100256 | A1 | 4/2010 | Jurmain et al. |
| 2010/0168918 | A1 | 7/2010 | Zhao et al. |
| 2010/0169815 | A1 | 7/2010 | Zhao et al. |
| 2011/0015569 | A1 * | 1/2011 | Kirschenman et al. .... 604/95.01 |
| 2011/0046781 | A1 | 2/2011 | Summer |
| 2011/0155785 | A1 * | 6/2011 | Laurent et al. ............. 227/180.1 |
| 2012/0185098 | A1 | 7/2012 | Bosscher et al. |
| 2012/0185099 | A1 | 7/2012 | Bosscher et al. |

FOREIGN PATENT DOCUMENTS

| | | |
|---|---|---|
| GB | 2 228 783 A | 9/1990 |
| WO | 03 055061 A1 | 7/2003 |
| WO | 2008 135978 | 11/2008 |
| WO | 2010/085184 A1 | 7/2010 |
| WO | 2011075093 | 6/2011 |

OTHER PUBLICATIONS

Cheung, Y., et al., "Cooperative Control of a Multi-Arm System Using Semi-Autonomous Telemanipulations and Adaptive Impedance", Advanced Robotis, 2009. ICAR 2009. International Conference on, IEEE, Piscataway, NJ, USA, Jun. 22, 2009, pp. 1-7.

Suzuki, A., et al., "Performance conditioning of time delayed bilaterial teleoperation system by scaling down compensation value of communication disturbance observer", Advanced Motion Control, 2010, 11th IEEE International Conference on, IEEE, Piscataway, NJ, USA, Mar. 12, 2010, pp. 524-529.

Tzafestas, C., et al., "Adaptive impedance control in haptic teleoperation to improve transparency under time-delay", 2008 IEEE International Conference on Robotics and Automation. The Half-Day Workshop on: Towards Autonomous Agriculture of Tomorrow, IEEE—Piscataway, NJ, USA, Piscataway, NJ, USA, May 19, 2008, pp. 212-219.

International Search Report mailed May 23, 2012; Application Serial No. PCT/US2011/066873 in the name of Harris Corporation.

Everett L J et al; "Automatic Singularity Avoidance Using Joint Variations in Robot Task Modification", IEEE Robotics & Automation Magazine, IEEE Service Center, Piscataway, NJ, US, vol. 1, No. 3, Sep. 1, 1994, pp. 13-19, XP011420425.

Jonghoon Park et al.: "Reconstruction of Inverse Kinematic Solution Subject to Joint Kinematic Limits Using Kinematic Redundancy", Intelligent Robots and Systems '96, IROS 96, Proceedings of the 1998 L EEE/RSJ International Conference on Osaka, Japan, Nov. 4-8, 1996, New York, NY, USA, IEEE, US, vol. 2, Nov. 4, 1996, pp. 425-430, XP010212433.

Hamid Abdi et al: "Joint Velocity Redistribution for Fault Tolerant Manipulators", Robotics Automation and Mechatronics (RAM), 2010 IEEE Conference on, IEEE, Piscataway, NJ, USA, Jun. 28, 2010, pp. 492-497, XP031710198.

International Search Report mailed Jun. 28, 2012, Application Serial No. PCT/US2012/027475 in the name of Harris Corporation.

European Search Report mailed Mar. 14, 2012, Application Serial No. 11009319.2-2316, in the name of Harris Corporation.

Marshall, W.C., et al., "A Testbed for Deisgn of User-Friendly, Multiple-Degree-Of-Freedom, Manual Controllers", Scientific Honeyweller, Honeywell's Corporate. Minneapolis, US Jan. 1, 1993, pp. 78-86.

International Search Report dated Oct. 29, 2012; Application Serial No. PCT/US2012/034207 in the name of Harris Corporation.

International Search Report dated Jan. 15, 2013, Application Serial No. PCT/US2012/037751 in the name of Harris Corporation.

International Search Report mailed Jan. 4, 2013, International Application Serial No. PCT/US2012/058303 in the name of Harris Corporation.

Tas, NR, et al., "Technical Note: Design, fabrication and testing of laterally driven electrostatic motors employing walking motion and mechanical leverage", Journal of Micromechanics & Microengineering, Institute of Physics Publishing, Bristol, GB, vol. 13, No. 1, Jan. 1, 2003. N6-N15.

Rogers, JE., et al., "Bi-directional Gap Closing MEMS Actuator Using Timing and Control Techniquest", IEEE Industrial Electronics, IECON 2006—32nd Annual Conference on, IEEE, Piscataway, NJ USA Nov. 1, 2006, pp. 3469-3154.

* cited by examiner

HAPTIC INTERFACE HANDLE WITH FORCE-INDICATING TRIGGER MECHANISM

STATEMENT OF THE TECHNICAL FIELD

The inventive arrangements relate to robot methods and systems, and more particularly to haptic interface controls for such systems.

DESCRIPTION OF THE RELATED ART

Simple user interface systems can provide a separately operable control for each movable joint of a robot, robotic manipulator, or other slave device. More complex systems can include hand controllers, which sense the movement of a user's hand. The hand controller generates one or more control signals which are then used for actuating various motion operations of the robot. For example, some hand controllers can move with as many as six degrees of freedom (i.e. linear movement with respect to three orthogonal axes, and rotational movement with respect to three orthogonal axes of rotation) The control system of the robot will respond to these control signals by activating certain servo-motors, solenoids, or other devices within the robotic manipulator to produce the desired motion. Video cameras can be used to provide visual information to a remote operator regarding a work piece and/or the environment surrounding the robotic manipulator.

Haptic technology or haptics involves tactile feedback provided by a device to a user. The tactile feedback is typically provided by applying forces, vibrations and/or motions to one or more portions of a user interface device. Haptics are sometimes used to enhance remote control devices associated with machines and devices. In such systems, sensors in the slave device are sometimes used to detect forces exerted upon such device. The information relating to such forces is communicated to a control unit, where the information is used to generate suitable tactile feedback for a user. With the growing use of haptic feedback systems, there is a continued need for user interface devices that are comfortable, rugged, and reliable.

In the field of hand controllers, there are some which include haptic features. However, existing hand controllers are expensive and are often arranged in ways that do not provide an intuitive experience for the user with respect to the resulting motion of the robot and/or resulting haptic feedback. Existing systems also tend to lack robust mechanical designs that are suited to use in the field.

SUMMARY OF THE INVENTION

The invention concerns a method and system for telematic control of a slave device. The method generally involves sensing a physical displacement of a trigger disposed on an elongated hand grip. The physical displacement is in a generally radial direction, transverse to a longitudinal axis of the hand grip. Based on the physical displacement of the trigger, one or more first motion control commands are generated to control a position of one or more fingers of a remotely controlled robot grasping device. Force sensing is performed at the grasping device to determine a force exerted by the fingers on a grasped object. Based on the force sensing, a resistance of the trigger to the physical displacement is dynamically controlled. In some embodiments, the resistance of the trigger is controlled so as to be proportional to the force exerted by the fingers on the grasped object. The resistance force for controlling the resistance of the trigger to the physical displacement can be provided by using a motor or servo disposed in the hand grip.

The method can also include sensing a position of a clutch switch disposed on the hand grip. In that case, the first or second motion control commands will be selectively communicated to the robot manipulator arm or the grasping device only if the clutch switch is in an active switch position. A position of the trigger is selected so that it is aligned with a front side of the hand grip, and a position of the clutch switch is also selected to be on the front side, adjacent to the trigger. More particularly, a position of the trigger and the clutch switch can be chosen so that each of the trigger and the clutch switch are spaced a small distance apart, generally aligned with the grip axis.

In some embodiments, the method can include locking a position of the fingers forming the grasping device in response to activation of a grip lock switch disposed on the hand grip. Also, the method can involve selectively transitioning between a position based control scheme and a velocity based control scheme in response to a switch disposed on the hand grip.

Further, the method can include sensing a physical displacement of the hand grip in any of several control directions. In response to such sensing, one or more second motion control commands is communicated to a robot manipulator arm to which the grasping device is attached to cause a motion of the robot manipulator arm or the grasping device (i.e. motion other than a grasping action).

The invention also concerns a system for telematic control of a slave device which includes a control interface comprising a hand grip having an elongated body. In some embodiments, the grip is coupled to a six axis control interface which senses movement of the grip with respect to as many as three orthogonal linear axes, and three orthogonal rotation axes. One or more sensors are provided for sensing a physical displacement of a trigger disposed on the hand grip in a radial direction with respect to a longitudinal axis of the hand grip. An actuator, such as a motor or servo motor, is disposed in the hand grip that is responsive to a control signal for dynamically controlling a force that the trigger applies to a user's finger. A control system operatively coupled to the one or more sensors is configured to generate one or more first motion control commands for controlling motion of the slave device based on output signals from the one or more sensors.

The slave device in some embodiments is a remotely controlled robot grasping device. Further, the first motion control commands can be configured to control a position of one or more fingers of the remotely controlled robot grasping device. The control system is configured to variably control a position of the one or more fingers based on a sensed extent of the physical displacement of the trigger. Further, the control system is configured to receive one or more grasping force information signals representing a force exerted by the fingers on a grasped object. Based on the grasping force information signal, the control system generates haptic control signals for dynamically controlling the actuator to vary a force exerted by the trigger upon a user's finger. For example, the control system in some embodiments is configured to vary the force applied by the trigger to be proportional to the force exerted by the robot fingers on the grasped object. The force applied by the trigger to the user is supplied by a motor or servo motor disposed in the hand grip.

The system also includes a plurality of hand grip position sensors provided for generating a hand grip position sensor output signal. The hand grip position sensor output signal represents a physical displacement of the hand grip in any of a plurality of control directions. The control system is configured to generate in response to the output signal one or more second motion control commands to cause a motion of a robot manipulator arm or a grasping device (other than the grasping motion).

A clutch switch is also disposed on the hand grip. The control system is configured to generate the first or second motion control commands only if the clutch switch is in an active switch position. The trigger is advantageously positioned at a front side of the hand grip, and a position of the clutch switch is also at the front side, adjacent to the trigger. The positions of the trigger and the clutch switch on the front side of the hand grip are generally aligned with the grip axis. A grip lock switch is also disposed on the hand grip. The control system is responsive to the grip lock switch for selectively locking a position of the fingers in response to activation of the grip lock switch. A switch disposed on the hand grip can also be provided for selectively transitioning the control system between a position based control scheme and a velocity based control scheme.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures, wherein like reference numbers are used throughout the figures to designate similar or equivalent elements. The figures are not drawn to scale and they are provided merely to illustrate the present invention. Several aspects of the invention are described below with reference to example applications for illustration. It should be understood that numerous specific details, relationships, and methods are set forth to provide a full understanding of the invention. One having ordinary skill(s) in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 1:
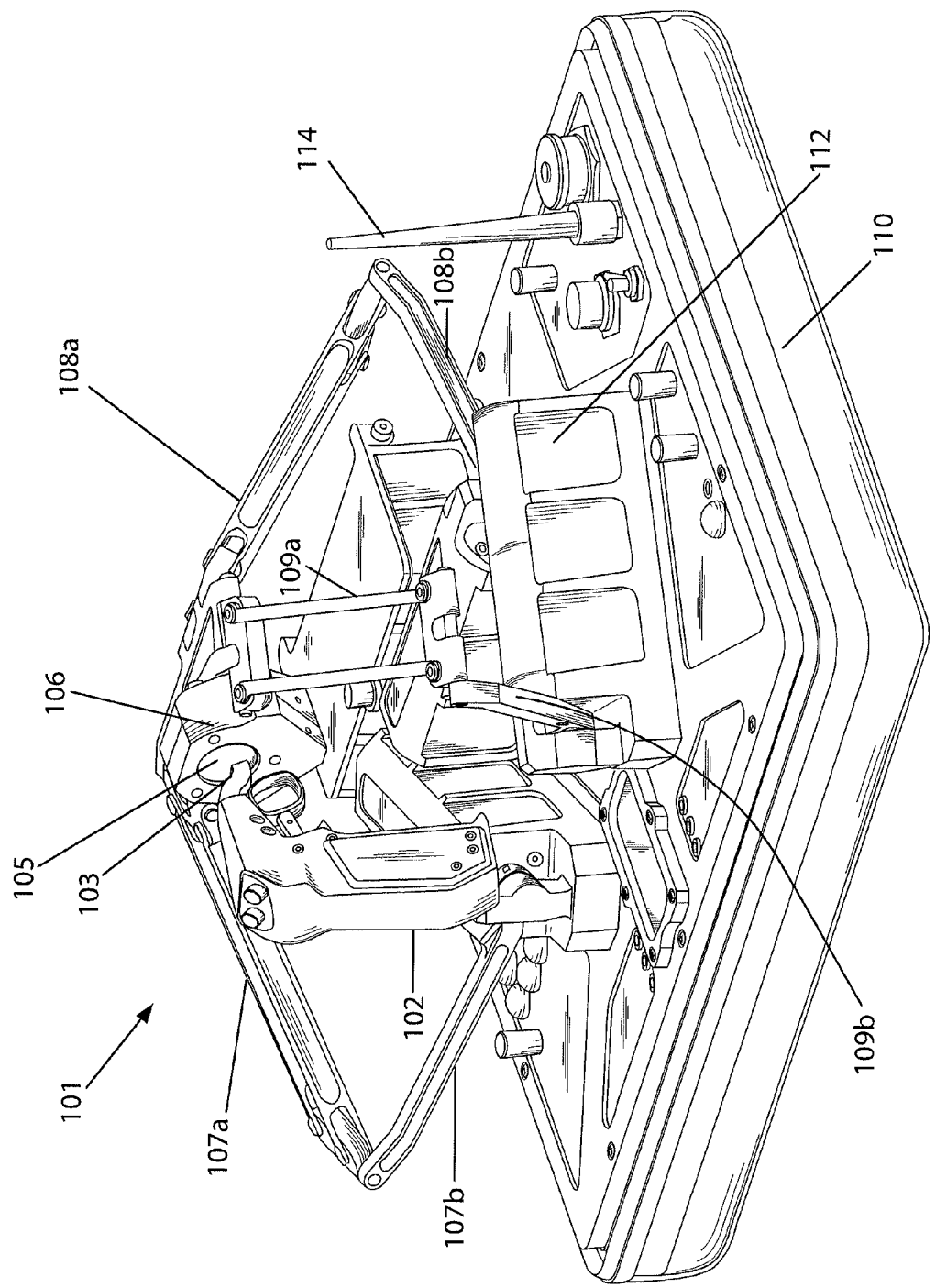
FIG. 1 is drawing which shows a control interface for a robot control system.

The present invention concerns telematic control systems, hand controllers, and more particularly a grip used in conjunction with hand controllers capable of measuring a position of a user's hand based on a position of the grip. The grip offers several improvements with regard to its operation, design and haptic feedback features. Referring now to FIG. 1, there is illustrated a grip 102 coupled to a hand controller 101. The hand controller 101 is capable of measuring a position of a user's hand based on a position of the grip. In some embodiments, the hand controller can detect motion with regard to as many as three orthogonal linear axes (x, y, z) and three rotational axes (yaw, pitch and roll). The hand controller includes a plurality of articulating arms 107a, 107b, 108a, 108b, and 109a, 109b which are pivotally attached to each other to allow the grip to move with regard to the x, y, and z axes. Sensors (not shown) mounted in base 110 detect a position of the articulating arms for generating output signals used to control a remote slave device. The output signals are processed by electronic circuitry in the base 110. For example, such electronic circuitry can include one or more computer processing devices, memory devices, and data transceiver equipment to aid in communicating with a remotely located slave device. An antenna 114 can be provided on base 110 for wireless communications.

A socket member 106 is attached to the articulated arms and has a ball 105 mounted therein so as to form a ball joint. A pin 103 is fixed to ball 105 and extends in a radial direction from the ball 105. The pin is securely attached at a distal end to the grip 102 so that movement of the grip is communicated to the ball. Sensors (not shown) mounted in socket 106 can detect rotational motion of the ball 105 with regard to as many as three orthogonal axes, and generate rotation output signals. Information concerning rotation of ball 105 and information regarding the position of articulating arms 107a, 107b, 108a, 108b, and 109a, 109b is advantageously used to generate grip position data. This information is then used to generate control signals for controlling the slave device. One or more actuators, motors or servo motors 112 can be disposed in the base 110 for causing motion of the articulating arms 107a, 107b, 108a, 108b, and 109a, 109b.

Figure 2:
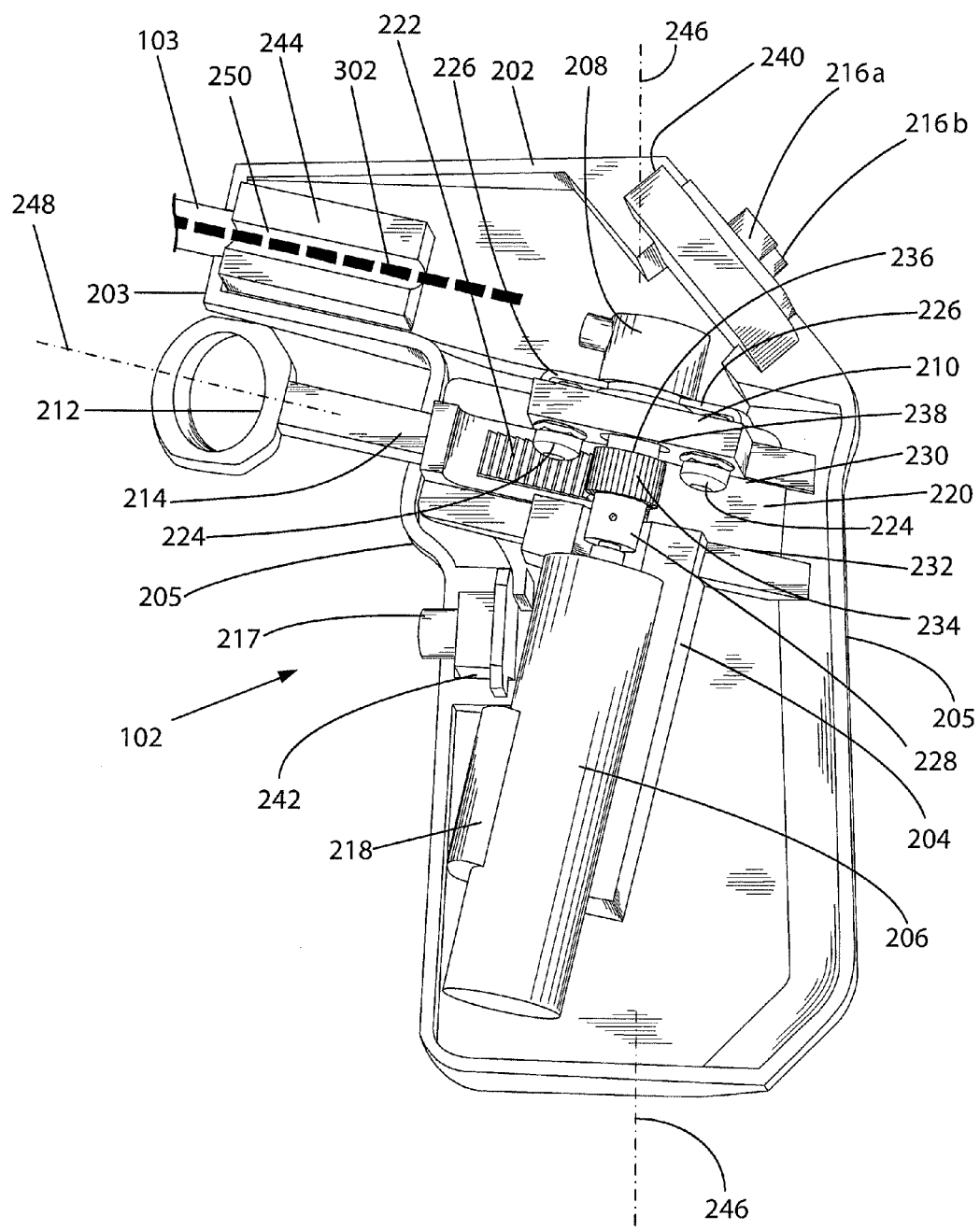
FIG. 2 is an enlarged view of an interior of the grip of the robot control system in FIG. 1.

Referring now to FIG. 2, the features of the grip 102 are shown in greater detail. The grip 102 is formed of a casing 202 in which as sub-frame 204 is provided. The casing 202 is a formed of a rigid material such as metal or polymer and can be generally shaped in the form of a pistol grip for ease of grasping. As such, the casing advantageously has an elongated form which is generally aligned along a grip axis 246. A rigid support block 244 is mounted to the frame and is also secured to the distal end of pin 103 such that the pin extends from a front portion 203 of the casing 202 in a direction which is generally transverse to the grip axis. The pin 103 is used to provide a rigid point of attachment by which the grip is secured to ball 105.

Sub-frame 204 is securely mounted in the casing and provides support for several additional components. Sub-frame 204 can be a machined, cast or molded item formed of a rigid material such as a metal or polymer. A trigger 212 extends through the casing 202 and includes a plunger 214 which is slidably mounted within channel 220. The trigger preferably extends from a front side 205 of the grip which faces towards the ball 105. As such, the trigger can move in a direction aligned with a trigger axis 248. As shown in FIG. 2, the trigger axis in some embodiments can be aligned with a radial direction defined with respect to the grip axis 246 such that the trigger axis and grip axis are generally transverse to each other. As will be understood from FIG. 2, the phrase "radial direction" does not require that the trigger axis 248 form a right angle with the grip axis 246. Instead, the trigger axis can be slightly canted or angled relative to the line defined by the grip axis 246. Also, the motion of the trigger may be along a path that is somewhat curved rather than perfectly linear, provided that the trigger movement is generally transverse to the direction of the axis 246 and along a generally radial path directed toward the front side 205 of the grip, rather than rotating around the grip axis 246.

In some embodiments, the trigger 212 is formed as an elongated or curved member which extends in a direction that is generally transverse to the trigger axis 248. In other embodiments, the trigger 212 can be formed as a circular or loop shaped profile so that the trigger can be pushed by a finger in a first direction (toward front side 205) or in a second direction (away from the front side 205). A loop shaped trigger 212 is preferred because it can allow a user to exert control forces, and experience haptic feedback forces in the first and second direction. Still, the invention is not limited in this regard and any other suitable trigger shape can also be used.

In the embodiment shown in FIG. 2, guide members 230, 232 guide the trigger 212 along the length of channel 220 when a force is exerted on the trigger. In the embodiment shown in FIG. 2, The channel 220 and guides 230, 232 are arranged such that the trigger, when depressed, will have a generally linear motion aligned with a direction that is transverse to the grip axis. More particularly, the trigger will move in a direction that generally extends from a front side 205 of the casing to a rear portion 205 defined along the elongated length of the grip 102. Still, other embodiments are also possible, and the trigger can instead rotate about a pivot point, provided that the trigger generally moves along a direction aligned with a radial line extending from the grip axis 246 rather than rotating around the grip axis 246 in a circumferential path.

In some embodiments, a gear rack 222 is provided on plunger 214. The gear teeth associated with gear rack 222 engage gear teeth in a pinion gear 234 such that sliding movement of the plunger 214 will cause rotation of the pinion gear 234, and rotation of the pinion gear will cause sliding movement of the plunger 214. Pinion gear 234 has upper and lower output shafts 236, 228. The upper output shaft 236 extends through an aperture 238 formed in a shelf portion 210 of sub-frame 204. The upper output shaft is secured to an input shaft of an angle sensor 208 which senses a rotation of the upper output shaft. The angle sensor 208 can be secured to the sub-frame 204 by suitable means such as bracket 226 and fasteners 224. The angle sensor 208 can be an encoder, or any other suitable sensor design including a mechanical, electrical or optical angle sensor. The lower output shaft 228 is connected to a motor 206 that is seated within the sub-frame 204. The motor 206 can be held in place within the sub-frame by any suitable means, such as a clip 218. According to some embodiments, the motor 206 can be a brushless DC motor or servo motor as are well known in the art.

It should be appreciated that the arrangement of the trigger, plunger, gear rack, pinion gear, sub-frame, angle sensor and motor shown in FIG. 2 are one possible embodiment of the invention. However, the arrangement shown is intended merely to provide one possible example of how the trigger system herein can be implemented. Other arrangements are also possible. For example, rather than sliding in a channel, the trigger could instead be arranged to rotate on a pivot. Of course, in such embodiments, the mechanical linkage between the trigger 212, the angle sensor 208, and the motor 206 would be modified to work with a pivot action of a trigger as opposed to a sliding action. Accordingly, the inventive arrangements are not intended to be limited to the mechanical details shown in FIG. 2. Instead, any other arrangement now known or known in the future, can also be used provided that it is capable of performing functions similar to those described herein with regard to the hand grip and trigger.

In some embodiments, casing 202 has a shape which is contoured to include one or more undulations which make the grip more ergonomic or comfortable when grasped by a user. Switch recesses 240, 242 are provided for receiving a plurality of control switches at selected locations on the grip. In a preferred embodiment, a clutch switch 217 is provided on a front side 205 of the grip, spaced below the trigger 212. The spacing between the trigger and clutch switch 217 is advantageously selected such that when the grip 102 is grasped in the palm of a user, and a user's index finger (also sometimes referred to as the pointer finger) rests on the trigger, the user's middle finger (the finger adjacent to the index finger) will be generally aligned with the clutch switch 217. Alternatively, the spacing between the trigger 212 and clutch switch 217 is selected so that the when a user's index finger is resting on the trigger 212, the clutch switch 217 is aligned with another of the user's fingers resting on the front side 205.

Control switches 216a, 216b are disposed on an upper part of the casing 202 so that when the palm or web portion of a user's hand between the index finger and thumb is placed on the back side 205 of the grip 102, the control switches can be easily accessed by a user's thumb. One or more control switches 216a, 216b can be provided for various purposes which shall be described in more detail as the discussion progresses. For example one of the control switches 216a can be a grip lock control, and the second control switch 216b can toggle the control system between a position based control and a velocity based control.

Figure 3:
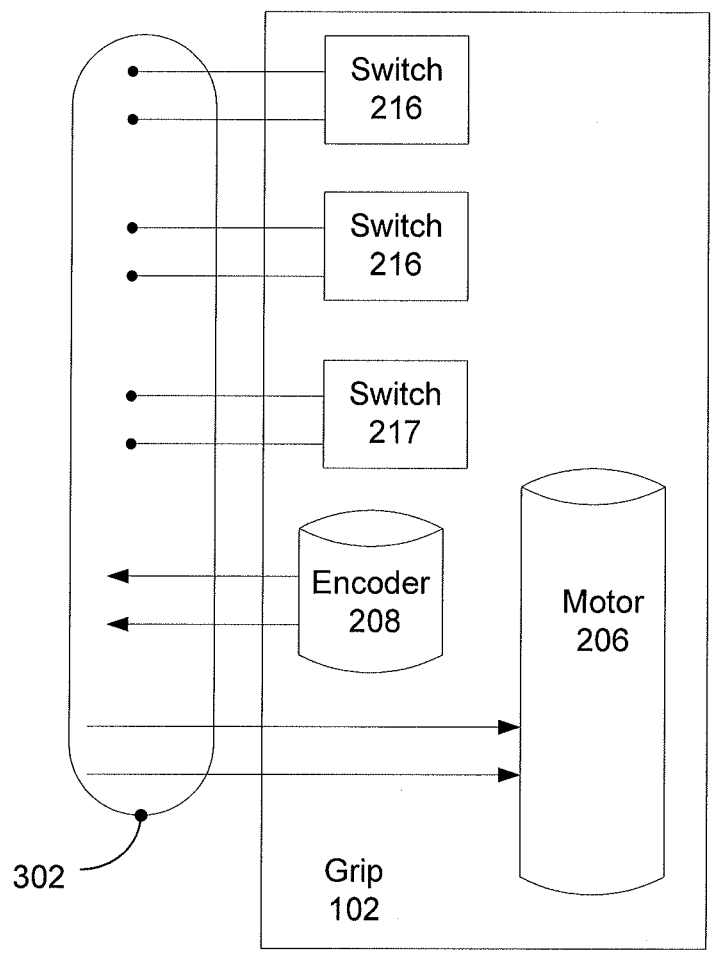
FIG. 3 is a block diagram that shows several components of the grip in FIG. 2.

Referring now to FIG. 3, the various components within the grip 102 are shown in block diagram form. Suitable electrical connections are provided to each of the components as shown. The wires connected to each of the components can be bundled together to form a wiring harness 302 which can be coupled to the electronic circuitry contained in the base 110. Alternatively, a serial bus controller (not shown) can be provided within the grip 102, in which case signals to and from the components in the grip can be communicated to/from circuitry in the base 110 by means of a simple serial bus cable. Of course the invention is not limited in this regard and any other suitable arrangement for communicating such signals can also be used.

As shown in FIG. 2, the wiring harness 302 is advantageously routed through a passage defined within the support block 244 and pin 103 and into the ball 105. Thereafter, the wiring harness can be routed into the base 110. The advantage of the foregoing arrangement is that there is no external wiring harness connected to the grip which can restrict the movement of the grip 102, snag on user's clothing, or otherwise become damaged by misuse. Still, the invention is not limited to this wire routing scheme, and other arrangements are also possible. For example, the wiring harness can be routed outside the casing 202 and directly into the base 110.

The hand controller described herein can be used to control a slave device, such as an unmanned ground vehicle (UGV). The slave device can also include a robot manipulator arm. The hand controller senses input control motions of a user and communicates user input signals to a control system processor. In response, the control system processor communicates motion control command signals to the slave device for controlling the movement of the slave device manipulator arm and/or grasping device. A data link can be used for the purpose of communicating motion control command signals to a remotely located slave device The user interface, control system processor, and data link can together comprise a telematic control system with haptic feedback.

Figure 4:
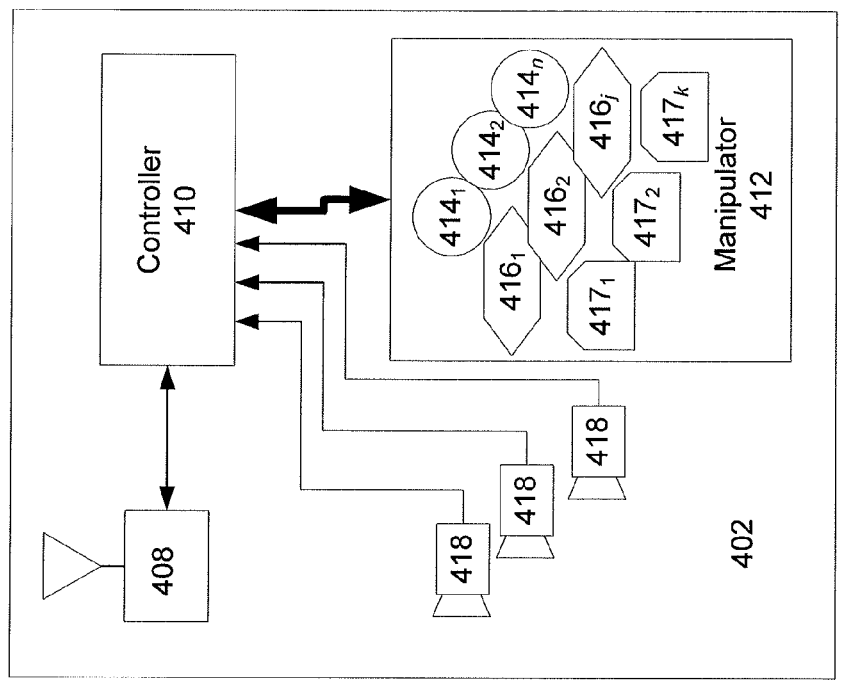
FIG. 4 is a block diagram that is useful for understanding the interaction of a robot control system and a slave device robot.
Figure 4:
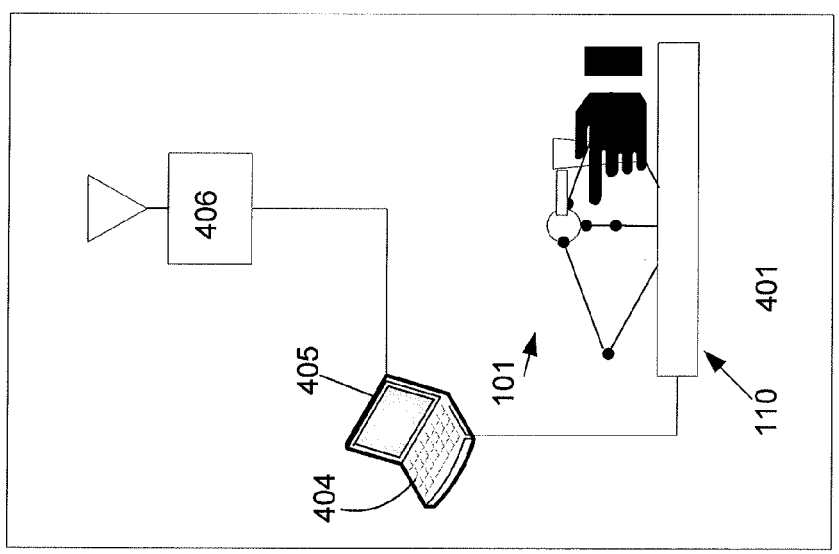

Referring now to FIG. 4, there is provided a simplified block diagram showing a robotic system 400 that includes a control system 401 (incorporating hand controller 101) and a slave device 402. A data communication system is provided between the control system 401 and slave device 402. The data communication system allows the control system 401 to communicate commands to slave device 402, and allows the control system to receive feedback information from the slave device 402.

The control system 401 includes the hand controller 101, a data processing system 404, and a data link 406. In some embodiments, the hand controller can sense hand movement along one, two or three linear directions of motion defined by orthogonal axes x, y, and z. The hand controller in some embodiments can also sense rotational hand movement around one, two or three rotational axes.

Data processing system 404 can include a portable computer programmed with a set of instructions. The data processing system 404 can be separate from the hand controller 101. A wired or wireless communication link in such embodiments can be provided between the hand controller 101 and the data processing system 404. In some embodiments, the data processing system 404 is fully integrated into the hand controller 101. For example, the data processing system 404 could be integrated into base 110 associated with the hand controller 101. The data processing system 404 can have an integrated display unit 405 as shown for purposes of displaying video images. However, the invention is not limited in this regard, and a separate video display unit (not shown) can also be used with the data processing system.

The control system also includes a data link 406. The data link 406 can be a separate unit. Alternatively, if the data processing system 404 is integrated into the hand controller 101, then it can be advantageous to also integrate the data link 406 within hand controller 101. Data link 406 can include any type of wired or wireless transceiver suitable for communicating data to and from data link 408 provided in slave device 402. If data links 406, 408 are wireless devices, the wireless interface can be based on any of a variety of well known wireless interface standards. Examples of such well known wireless interface standards can include the Bluetooth wireless standard, and the IEEE 802.11 family of standards. However, the invention is not limited in this regard and any other wireless interface standard can be used. Data communicated over the data link can include motion control commands directed to slave device 402, feedback data communicated from slave device 402 to the data processing system 404, and video data communicated from the slave device 402 to the data processing system 404. The data link can include transmitter circuitry 606, receiver circuitry 608, a receive/transmit switch 604, and an antenna 602.

Slave device 402 can be any type of remotely controlled slave device or robot system capable of performing moving, manipulating and/or grasping actions based on telematic commands received from control system 401. Slave device 402 includes onboard circuitry for processing motion control commands and communicating feedback data to control system 401. For example, slave device 402 can advantageously include an on-board controller 410. The on-board controller 410 can be any suitable type of processing device such as a microprocessor, microcontroller, application specific integrated circuit, and so on. The on-board controller 410 can further include software, firmware or other programming for carrying out the methods described herein. The on-board controller 410 performs communication operations involving data link 408, which can provide communication capabilities similar to those described herein with regard to data link 406.

Figure 5:
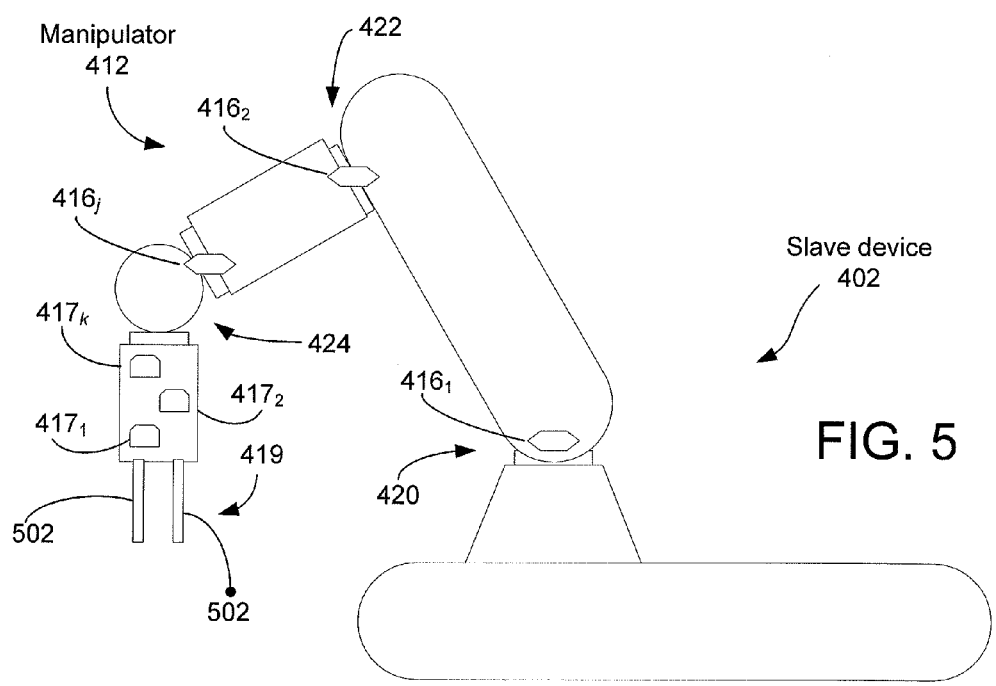
FIG. 5 is a diagram that is useful for understanding the features of a robot manipulator arm which has a grasping device.

In some embodiments of the invention, the slave device 402 is comprised of a remotely controlled manipulator 412. The manipulator 412 can include any movable mechanical appendage associated with the slave device. According to some embodiments, the manipulator can be a remotely controlled manipulator arm which includes one or more mechanical joints. For example, such an embodiment of slave device 402 is shown in FIG. 5. Manipulator arms of this type are generally known in the art and therefore will not be described here in detail. However, a brief description of one embodiment of a manipulator 412 is provided to help understand the invention.

The manipulator 412 can include a grasping device 419 and one or more servos $414_1$, $414_2$, ... $414_n$ or other suitable motivating devices for moving one or more mechanical joints 420, 422, 424 of the manipulator in a direction and at a velocity determined by the motion control command signals. The servos can also be used to operate the gripper 419 for grasping objects. Feedback information communicated from slave device 402 to control system 401 can include position information with regard to the one or more movable joints of the manipulator 412. The position information can be provided by one or more sensors $416_1$, $416_2$, ... $416_j$. For example, in FIG. 5, sensors $416_1$, $416_2$, ... 416 are provided at each of movable joints 420, 422, 424. In some embodiments, the sensors can also be provided to movable portions of the grasping device 419 for sensing forces experienced by the manipulator and/or grasping device. For example, one or more sensors $417_1$, $417_2$, ... $417_k$ can be used for this purpose. The sensors can detect a grasping force exerted upon an object by the grasping device 419. In FIG. 5, three sensor are shown at the base of grasping device 419, but the invention is not limited in this regard. More or fewer sensors can be provided.

The data from the sensors $416_1$, $416_2$, ... $416_j$ and $417_1$, $417_2$, ... $417_k$ is communicated to the on-board controller 410, which performs any necessary data formatting before communicating the data to data link 408. The information is then communicated by data link 408 to data link 406 at the control system 401. One or more cameras 418 can be attached to a portion of a manipulator and video information from the cameras can similarly be communicated to the control system 401.

Figure 6:
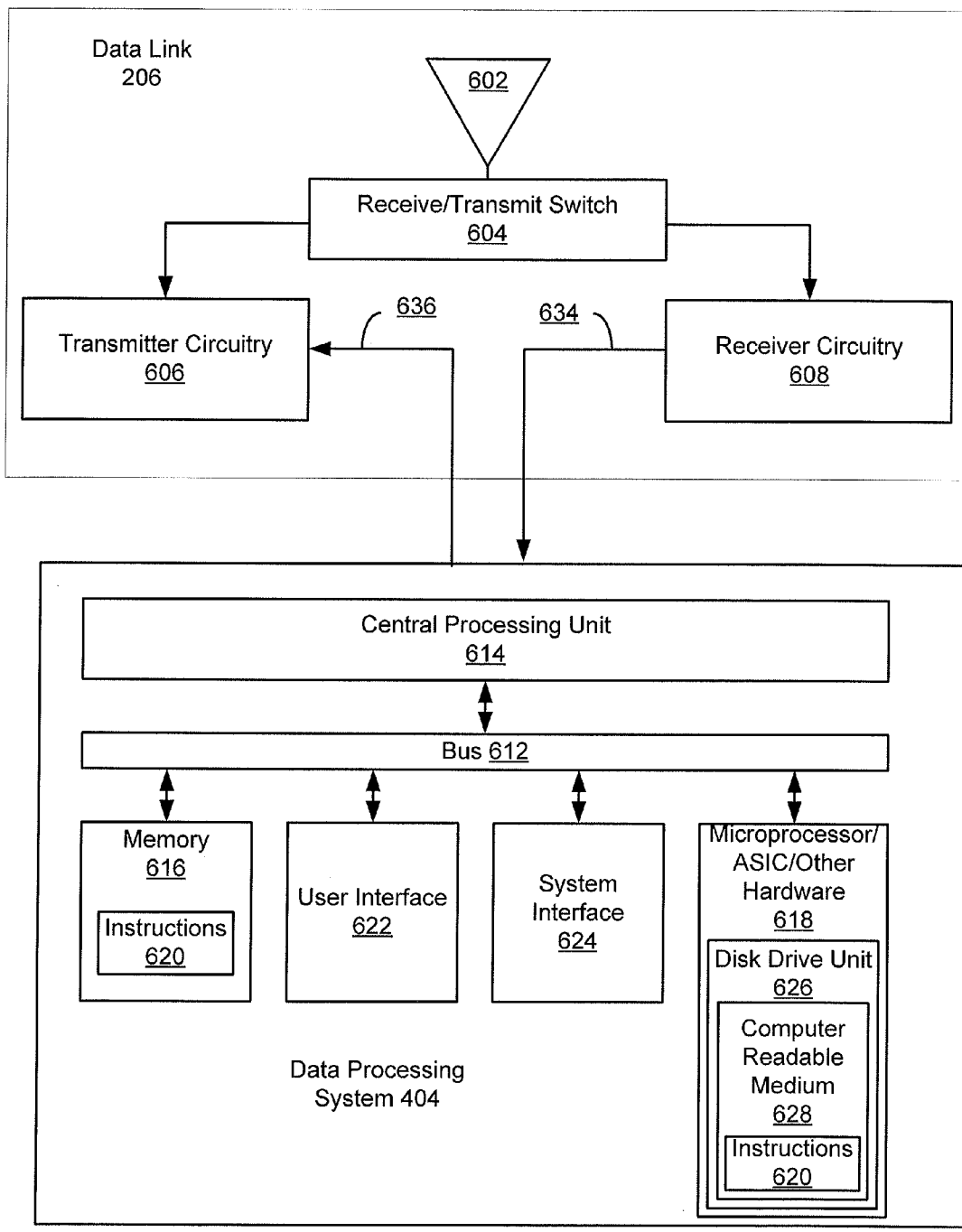
FIG. 6 is a detailed block diagram of a data processing system and data link that can be used with the robot control system of FIG. 5.

Referring now to FIG. 6, the data processing system 404 will be described in further detail. The data processing system includes a system interface 624, a user interface 342, a Central Processing Unit (CPU) 614, a system bus 612, a memory 616 connected to and accessible by other portions of the data processing system 404 through system bus 612, and hardware entities 618 connected to system bus 612. System interface 624 allows the data processing system 404 to communicate directly with data link 406, network equipment and other data links via a wired communications link. At least some of the hardware entities 618 perform actions involving access to and use of memory 616, which may be a random access memory (RAM), a disk drive, and/or a compact disc read only memory (CD-ROM).

Hardware entities 618 may include microprocessors, application specific integrated circuits (ASICs) and other hardware. Hardware entities 618 may include a microprocessor programmed for facilitating the provision of data communication services and slave device control processing as described herein. In this regard, it should be understood that the microprocessor can access and run slave device control processing including stiffness estimation and scaling operations as described herein. The communication operations can include, but are not limited to, signal receiving operations, signal processing operations, signal generation operations, and signal communication operations.

As shown in FIG. 6, the hardware entities 618 can include a disk drive unit 626 comprising a computer-readable storage medium 628 on which is stored one or more sets of instructions 620 (e.g., software code) configured to implement one or more of the methodologies, procedures, or functions described herein. The instructions 620 can also reside, completely or at least partially, within the memory 616 and/or within the CPU 614 during execution thereof by the data link 206. The memory 616 and the CPU 614 also can constitute machine-readable media. The term "machine-readable media", as used here, refers to a single medium or multiple media (e.g., a centralized or distributed database, and/or associated caches and servers) that store the one or more sets of instructions 620. The term "machine-readable media", as used here, also refers to any medium that is capable of storing, encoding or carrying a set of instructions 620 for execution that cause the data processing system 204 to perform any one or more of the methodologies of the present disclosure.

Figure 7:
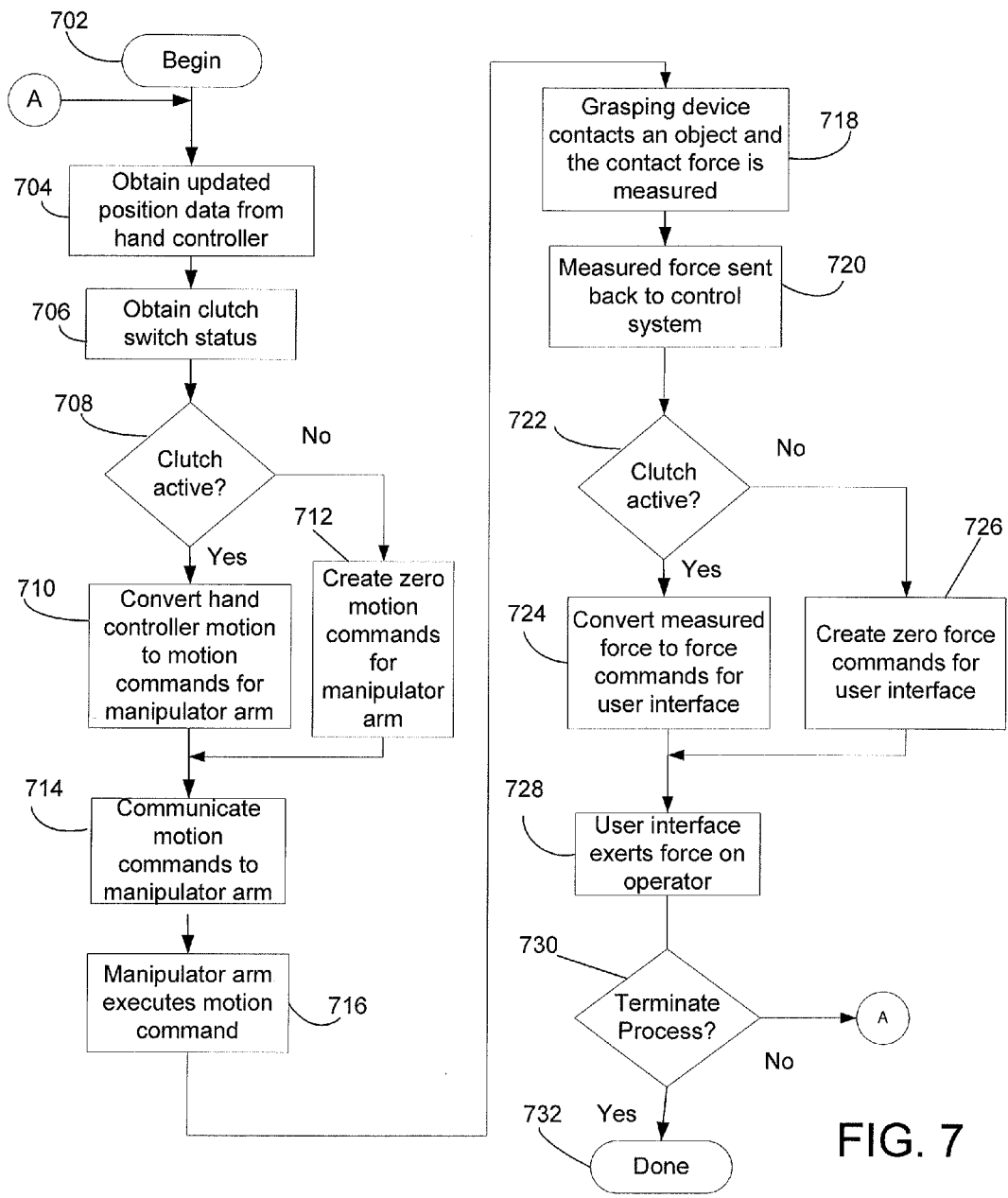
FIG. 7 is a flow chart that is useful for understanding a telematic method for controlling an interaction between a robot control interface and a robot manipulator arm having a clutch control.

Exemplary embodiments of the present invention will now be described in relation to FIGS. 2-8. In FIG. 7, a clutch switch is used to determine whether user manipulation of a hand controller will result in motion of a slave device manipulator arm. The processing method in FIG. 7 can begin in step 702 and continues with step 704. Updated position data is obtained at 704 from the hand controller. The updated position data can include the position of the hand controller 101 with regard to as many as six degrees of freedom (three orthogonal linear axes, and three orthogonal rotational axes).

In step 706, the system determines the status of a clutch switch 217. The clutch switch 217 controls whether the manipulator arm will respond to a movement of the hand control. If the clutch switch 217 is activated (e.g. switch closed), then the manipulator arm will respond to movements of the grip 102 and/or trigger 212. Conversely, if the clutch switch is not activated (e.g. switch open) then the control system 401 will cause the manipulator arm to not respond to movements of the grip 102. In some embodiments of the invention, the clutch switch 217 is positioned below the trigger on the front side 205 of the grip as shown in FIG. 2; however, the invention is not limited in this regard.

In step 708 the system determines whether the clutch switch is active. If not (708: NO) then the system continues to step 712 and a zero motion command is created for the manipulator arm. However, if the clutch switch is active (708: YES) then the system continues on to step 710. At step 710, hand controller motions are converted to motion commands for the manipulator arm. This step can involve converting signals received from hand controller 101 to a format that is suitable for causing a movement of the manipulator arm. In some embodiments 710 can include determining a distance that the hand controller 101 has moved in a predetermined time, a direction of such movement, and/or a velocity of such movement. As will be appreciated by one skilled in the art, such information can be derived from one or more sensors provided for sensing motion of the hand controller 101.

At 714, one or more motion control commands are communicated to the manipulator arm using data links 206, 208. Controller 210 responds to such commands by controlling one or more actuators or motivating devices (electric motors, servos, and so on) at the manipulator arm. These actuators produce a movement of the manipulator arm which is responsive to the user input commands at hand controller 101. For example, in some embodiments the motion control commands cause movement of the manipulator arm.

In step 718, haptic feedback data is obtained from one or more sensors associated with the robotic manipulator arm 202. More particularly, if the manipulator arm or its associated grasping device contacts an object, a contact force is measured in step 718. The contact force can be derived from force or pressure sensors $417_1$, $417_2$, ... $417_k$ at the robot slave unit 402, its associated manipulator arm 412, or its grasping device 419. In step 720, the feedback data from the manipulator arm 202 is communicated to the control system 201 using data links as previously described.

At step 722, a determination is again made as to whether the clutch is active. If not (722: No) then the control system creates a zero force command and communicates such zero force command to the user interface (hand controller 101). The zero force commands indicate that no force is applied to the user by the user interface. Alternatively, if the clutch is determined to be active (722: Yes) then the control system generates one or more force commands which do produce a force at the user interface. Additional processing may be performed at this step to determine an appropriate force to be generated at the hand controller in response to the measured forces.

At 728, the force commands will cause the user interface to exert a force upon the user (assuming that they are not zero force commands). The force can be exerted by the hand controller 101 in as many as six different directions, i.e. a vector direction defined with respect to as many as three orthogonal linear axes and as many as three rotational axes. A determination is made at 730 as to whether the process should be terminated, for example in response to a user input. If so, [730: YES] then the process terminates at 732. If the process is not to be terminated [730: NO], then the process returns to step 704.

In the embodiment described above with respect to FIG. 7, the clutch switch is used only to control the motion of the robot arm. However, it should be understood that the invention is not limited in this regard. Instead, the clutch could also be used to control motion of the grasping device in a manner similar to that described with respect to the robot arm. For example, a grasping action involving movement of robot fingers in a grasping device can be controlled by a trigger as described below with respect to FIG. 8. Such grasping action in some embodiments is enabled or disabled by the clutch control.

Figure 8:
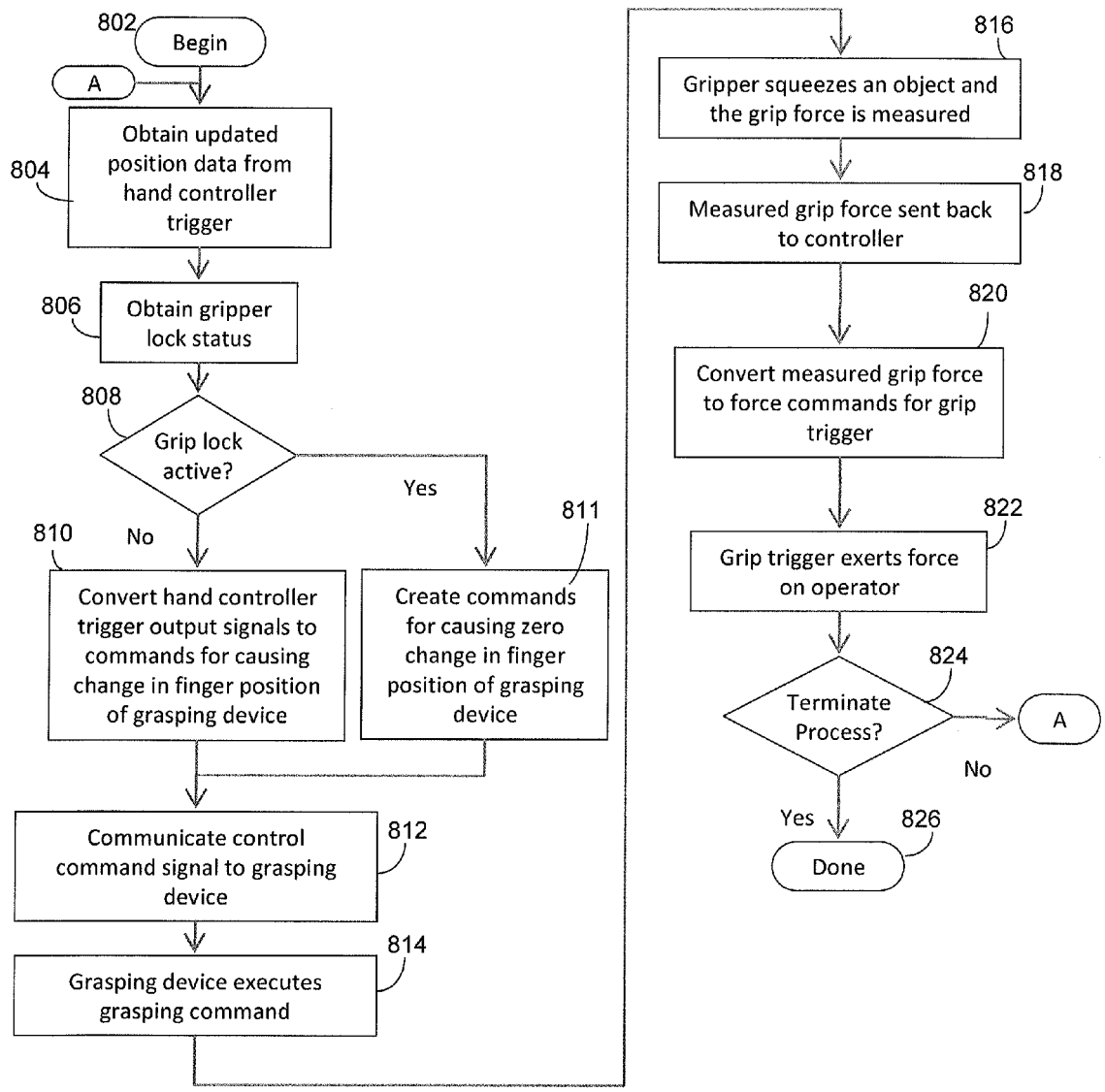
FIG. 8 is a flow chart that is useful for understanding a telematic method for controlling an interaction between a robot control interface including a haptic trigger control and a grip lock control

Referring now to FIG. 8, a gripping operation performed with hand control 101 will now be described in further detail. The processing method in FIG. 8 can begin in step 802 and continues with step 804. Updated position data is obtained at 804 from the hand controller trigger. The updated position data can include position data provided by angle sensor 208 regarding the position of trigger 212. Such data can represent a position of trigger 212 which is determined by a user exerting a force upon such trigger. For example, the trigger can be moved with the user's index finger.

In step 806, the system determines the status of a gripper lock switch 216a. The gripper lock switch 216a will lock a position of one or more robot fingers 502 associated with a grasping device 419. Once the gripper lock switch is activated, the user can release the trigger 212 and the grasping device will retain its grip on an object.

In step 808 the system determines whether the gripper lock switch is active. If so (808: Yes) then the system continues to step 811 and a zero motion command is created for the fingers of the grasping device. However, if the gripper lock switch is not active (808: No) then the system continues on to step 810.

At step 810, hand controller trigger motions are converted to motion commands for causing changes in the positions of robot fingers 502. This step can involve converting signals received from angle sensor 208 to a format that is suitable for causing a movement of the robot fingers in a direction indicated by a user. In some embodiments 810 can include determining a distance that the plunger 214 has moved in a predetermined time, a direction of such movement, and/or a velocity of such movement. As will be appreciated by one skilled in the art, such information can be derived from angle sensor 208.

At 812, one or more motion control commands are communicated to the grasping device using data links 206, 208. At step 8124, controller 210 responds to such commands by controlling one or more actuators or motivating devices (electric motors, servos, and so on) at the grasping device. These actuators produce a movement of the robot fingers which is responsive to the user input commands at trigger 212.

In step 816, the grasping device grasps an object and the grip force is measured. The gripping force can be derived from force or pressure sensors $418_1$, $418_2$, ... $417_k$ at the grasping device 419. Thereafter, in step 818, the measured grip force data is communicated to the control system 201 using data links as previously described. At step 820, the force measured in step 816 is used to generate one or more grip force commands which are directed to the hand controller, and particular to the trigger actuator. At 822, the grip force commands will cause the trigger to exert a force upon the user. For example, force commands can cause motor 206 to generate a rotational force which is communicated to plunger 214 through pinion gear 228 and gear rack 222. The force can be directed toward the grip axis or away from the grip axis, depending upon the forces measured by the sensors in the grasping device.

A determination is made at 824 as to whether the process should be terminated, for example in response to a user input. If so, [824: Yes] then the process terminates at 826. If the process is not to be terminated [824: No], then the process returns to step 804.

In some embodiments of the present invention, the control system 201 is configured such that the force applied by the motor 206 to the plunger 214 will be opposed to a direction of force applied by a user to the trigger 212. More particularly, as the trigger 212 is depressed toward the grip, the grasping device 419 will apply a grasping force by closing upon an object located between fingers 502. The force applied by the fingers 502 to the object is increased as the user pushes the trigger further into the grip 102. The gripping force will be sensed by sensors $417_1$, $417_2$, ... $417_k$ and such information will be communicated back to the control system as described above. The control system will apply control signals to motor 206 so that the haptic force applied to the trigger by the motor will increase as the level of force detected by the sensors is increased. A similar result will occur when the user causes the trigger 212 to move away from the grip. Sensors $417_1$, $417_2$, ... $417_k$ will detect any forces as applied to the robot fingers and these sensed forces are used to generate a force applied to the user's finger by trigger 212.

The foregoing arrangement provides a highly intuitive grasping and feedback system to a user. The user causes a grasping action by depressing the trigger 212. Such action by the user is intuitively familiar because it is similar to the manner in which the user would actually grasp an object, i.e. by moving his forefinger toward his thumb. The haptic feedback is also highly intuitive from the user's standpoint because he can sense the grasping force increasing in a manner that is very similar to the manner that would be experienced if the user was directly grasping an object with his own hand. The user can also receive tactile feedback when the robot fingers make contact with objects or encounter resistance.

Referring again to FIG. 2, the control system can also be configured to respond to switch 216b by changing the way that the control system responds to motion control inputs received from the hand controller 101. For example, switch 216b can be used to toggle the control system between a position based control system and a velocity based control system. In a position based control system, a change in position of the user interface results in a commanded change in desired position of the manipulator arm. In a velocity based control scheme a change in position of the user interface results in a change in the commanded velocity of the manipulator arm. Pressing switch 216b causes the control system to toggle between these two control modes.

In a similar manner, the opening and closing of the gripper fingers can be controlled in either a position mode or a velocity mode. In position mode a change in position of the trigger results in a commanded change in position of the gripper fingers. In velocity mode a change in position of the trigger results in a commanded change in the opening or closing speed of the gripper fingers. In some embodiments the toggling between the two modes is performed automatically by the data processing system 404 based on a function of the current trigger position, the previous trigger position, time, and the measured grip force of the robot fingers. In general, this automatic toggling between position and velocity modes can be based on any function of the measurable inputs and states of the system, including button presses.

It should be appreciated that while embodiments of the invention have been described in terms of a robot slave device 202 such as a UGV and a robotic manipulator arm 412, the invention is not intended to be so limited. Instead, the remotely controlled slave device 202 can include any type of device, provided that such device is capable of being remotely controlled by an operator through the use of telematic systems. As used herein, the phrase telematic system can include any technology capable of sending, receiving, and storing information via telecommunication devices in conjunction with effecting control on remote objects.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for telematic control of a slave device, comprising:
sensing a physical displacement of a trigger disposed on an elongated hand grip in a radial direction, transverse to a longitudinal axis of said hand grip;

based on said physical displacement of said trigger, generating one or more first motion control commands to control a position or velocity of one or more fingers of a remotely controlled robot grasping device;
force sensing at said grasping device a grasping force exerted by said fingers on a grasped object; and
based on said force sensing, dynamically controlling a trigger force exerted upon a user by rotating a pinion gear so as to cause a force to be applied to the trigger in a direction opposed to a direction of a force applied by a user to the trigger, where the pinion gear engages a gear rack disposed on a plunger portion of the trigger.

2. The method according to claim 1, further comprising controlling said trigger force to be proportional to said grasping force exerted by said fingers on said grasped object.

3. The method according to claim 1, further comprising:
sensing a physical displacement of said hand grip in any of a plurality of control directions; and
responsive to said sensing, communicating one or more second motion control commands to a robot manipulator arm to which said grasping device is attached to cause a motion of said robot manipulator arm or said grasping device.

4. The method according to claim 3, further comprising sensing a position of a clutch switch disposed on said hand grip, and generating a motion control command to move said robot manipulator arm or said grasping device in response to said sensed physical displacement of said hand grip only if said clutch switch is in an active switch position.

5. The method according to claim 3, further comprising selecting a position of said trigger to be aligned with a front side of said hand grip, and selecting a position of a clutch switch to also be on said front side, adjacent to said trigger.

6. The method according to claim 5, further comprising selecting a position of said trigger and said clutch switch to each be aligned with said grip axis.

7. The method according to claim 1, further comprising generating said trigger force by using a motor disposed in said hand grip.

8. The method according to claim 1, further comprising selectively locking a position of said fingers in response to activation of a grip lock switch disposed on said hand grip.

9. The method according to claim 1, further comprising selectively transitioning between a position based control scheme and a velocity based control scheme.

10. A system for telematic control of a slave device, comprising:
a control interface comprising a hand grip having an elongated body;
at least one sensor configured to sense a physical displacement of a trigger disposed on said hand grip in a radial direction with respect to a longitudinal axis of said hand grip;
an actuator disposed in said hand grip and configured to dynamically control a trigger force applied by said trigger to a user in response to a control signal; and
a pinion gear engaging a gear rack disposed on a plunger portion of the trigger and rotatable configured to cause a force to be applied to the trigger in a direction opposed to a direction of a force applied by a user to the trigger.

11. The system according to claim 10, further comprising the slave device in communication with said control interface and configured to apply a variable grasping force to an object responsive to said physical displacement, and wherein said control signal is selectively varied responsive to an output of a second sensor configured to measure said variable grasping force actually applied by said slave device to said object.

12. The system according to claim 10, further comprising a control system operatively coupled to said at least one sensor and configured to generate one or more first motion control commands for controlling motion of said slave device based on output signals from said at least one sensor.

13. The system according to claim 12, wherein said slave device is a remotely controlled robot grasping device, and said first motion control commands control a position or velocity of one or more robot fingers of the remotely controlled robot grasping device.

14. The system according to claim 13, wherein said control system is configured to variably control a position or velocity of said one or more robot fingers based on a sensed extent of said physical displacement of said trigger.

15. The system according to claim 13, wherein said control system is configured to receive at least one grasping force information signal representing a force exerted by said robot fingers on a grasped object and, based on said grasping force information signal, generate a haptic control signal for dynamically controlling said actuator to selectively vary said trigger force.

16. The system according to claim 15, wherein said control system is configured to vary said trigger force to be proportional to said force exerted by said robot fingers on said grasped object.

17. The system according to claim 12, further comprising:
a plurality of hand grip position sensors configured to generate a hand grip position sensor output representing a physical displacement of said hand grip in any of a plurality of control directions; and
wherein said slave device comprises a robot manipulator arm and said control system is configured to generate in response to said hand grip position sensor output one or more second motion control commands to cause a motion of said robot manipulator arm.

18. The system according to claim 12, further comprising a clutch switch disposed on said hand grip, wherein said control system is configured to generate said motion control command to move said robot manipulator arm in response to said sensed physical displacement of said hand grip only if said clutch switch is in an active switch position.

19. The system according to claim 18, wherein a position of said trigger is at a front side of said hand grip, and a position of said clutch switch is also at said front side, adjacent to said trigger.

20. The system according to claim 19, wherein a position of said trigger and said clutch switch are aligned with said grip axis.

21. The system according to claim 10, wherein said trigger force is provided by a motor disposed in said hand grip.

22. The system according to claim 17, wherein said robot manipulator arm further comprises a grasping device having a plurality of fingers, and said control system is responsive to a grip lock switch disposed on said hand grip for selectively locking a position of said fingers in response to activation of said grip lock switch.

23. The system according to claim 17, wherein said control system is responsive to a switch disposed on said hand grip for selectively transitioning between a position based control scheme and a velocity based control scheme.

24. The system according to claim 14, wherein said grip is coupled to a six axis control interface which senses movement of said grip with respect to three orthogonal linear axes, and three orthogonal rotation axes.

25. A system for telematic control of a slave device, comprising:

a control interface comprising a hand grip having an elongated body;
at least one sensor configured to sense a physical displacement of a trigger disposed on said hand grip in a radial direction with respect to a longitudinal axis of said hand grip;
an actuator disposed in said hand grip and responsive to a control signal to dynamically control a trigger force applied by said trigger to a user;
a channel defined in said hand grip;
a plunger portion of said trigger which slides within said channel, said plunger portion having a gear rack disposed thereon; and
a pinion gear which engages said gear rack and rotates when said plunger slides within said channel;
wherein said actuator and said at least one sensor rotate on a common axis defined by said pinion gear.

* * * * *